(12) United States Patent
Hergenrother et al.

(10) Patent No.: US 6,512,035 B1
(45) Date of Patent: Jan. 28, 2003

(54) PROCESSABILITY OF SILICA-REINFORCED RUBBER CONTAINING A MONOFUNCTIONAL ALKYL TIN COMPOUND

(75) Inventors: William L. Hergenrother, Akron, OH (US); Chen-Chy Lin, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/571,087

(22) Filed: May 15, 2000

(51) Int. Cl.[7] ................................................. C08L 5/24
(52) U.S. Cl. .................... 524/262; 524/399; 152/209.1; 152/450
(58) Field of Search ................................ 524/262, 399; 152/209.1, 450

(56) References Cited

U.S. PATENT DOCUMENTS

| | | | |
|---|---|---|---|
| 3,426,473 A | 2/1969 | Cardarelli et al. | 106/15 |
| 4,436,847 A | 3/1984 | Wagner | 5232/203 |
| 5,658,987 A | 8/1997 | Nakamura et al. | 525/99 |
| 5,717,022 A | 2/1998 | Beckmann et al. | 524/493 |
| 5,780,538 A | 7/1998 | Cohen et al. | 524/494 |
| 5,798,408 A | 8/1998 | Zanzig et al. | 524/505 |
| 5,804,636 A | 9/1998 | Nahmias et al. | 524/492 |
| 5,866,171 A | 2/1999 | Kata | 425/46 |
| 5,866,650 A | 2/1999 | Lawson et al. | 524/572 |
| 5,872,176 A | 2/1999 | Hergenrother et al. | 524/494 |
| 5,876,527 A | 3/1999 | Tsuruta et al. | 152/541 |
| 5,914,364 A | 6/1999 | Cohen et al. | 524/494 |
| 5,916,961 A | 6/1999 | Hergenrother et al. | 524/572 |
| 5,929,149 A | 7/1999 | Matsuo et al. | 524/262 |
| 5,931,211 A | 8/1999 | Tamura | 152/209.5 |
| 5,971,046 A | 10/1999 | Koch et al. | 152/152.1 |
| 6,008,295 A | 12/1999 | Takeichi et al. | 525/105 |
| 6,017,988 A | 1/2000 | Blok et al. | 524/424 |
| 6,025,428 A | 2/2000 | Day | 524/492 |
| 6,025,430 A | 2/2000 | Blok et al. | 524/526 |
| 6,177,495 B1 * | 1/2001 | Cohen | 524/262 |
| 6,191,247 B1 | 2/2001 | Ishikawa et al. | 528/30 |

FOREIGN PATENT DOCUMENTS

| | | |
|---|---|---|
| CA | 2242783 | 1/1999 |
| CA | 2242801 | 1/1999 |
| CA | 2243091 | 1/1999 |
| EP | 0 801 112 | 10/1997 |
| EP | 0 890 588 | 1/1999 |
| EP | 0 890 603 | 1/1999 |
| EP | 0 890 606 | 1/1999 |
| EP | 1 031 604 | 8/2000 |
| EP | 1 061 097 | 12/2000 |
| JP | 11 181161 | 7/1999 |

* cited by examiner

Primary Examiner—David W. Wu
Assistant Examiner—R. Harlan
(74) Attorney, Agent, or Firm—Meredith E. Palmer; Barbara Arndt

(57) ABSTRACT

The invention relates generally to the use of processing aids to improve the dispersion of silica reinforcing filler in rubber compounds. In particular, the invention relates to the use of a monofunctional alkyl tin compound as a processing aid in the rubber compounding process. More particularly, the invention provides a vulcanizable elastomeric composition and vulcanized elastomeric products, especially pneumatic tire treadstock that exhibits decreased rolling resistance, hysteresis, and improved snow, ice, and wet traction.

26 Claims, No Drawings

PROCESSABILITY OF SILICA-REINFORCED RUBBER CONTAINING A MONOFUNCTIONAL ALKYL TIN COMPOUND

FIELD OF THE INVENTION

The invention relates generally to the use of processing aids to improve the dispersion of silica reinforcing filler in rubber compounds. More particularly, the invention provides a vulcanizable elastomeric composition containing a filler-dispersing aid, and a pneumatic tire having improved snow and ice traction, wet traction, rolling resistance and hysteresis.

BACKGROUND OF THE INVENTION

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, elastic modulus, tan delta ($\delta$), and the like. Rubber articles, especially tires, produced from vulcanized elastomers exhibiting these improved properties will have reduced hysteresis, better rolling resistance, snow and ice traction, and wet traction, and improved fuel economy for vehicles equipped with such tires. Traditionally, improved dispersion of reinforcing fillers has been accomplished by lengthened mixing times. However, in commercial applications, prolonged mixing times result in decreased production and increased expense.

With the increasing use of silica as a reinforcing filler for rubber, filler dispersion in rubber stocks has become a major concern. Because polar silanol groups on the surface of silica particles tend to self-associate, reagglomeration of silica particles occurs after compounding, leading to poor silica dispersion, a high compound viscosity and a shorter scorch time. Therefore, it is desirable to improve the dispersion of silica in rubber compounds, especially when used for tire treads, to improve performance characteristics.

Previous attempts at preparing readily processable, vulcanizable silica-filled rubber stocks containing natural rubber or diene polymer and copolymer elastomers have focused on the use, during compounding, of bifunctional silica coupling agents having a moiety (e.g., a silyl group) reactive with the silica surface, and a moiety (e.g., a mercapto, amino, vinyl, epoxy or sulfur group) that binds to the elastomer. Well known examples of such silica coupling agents are mercaptosilanes and bis-(3-trialkoxysilylorgano) polysulfides, such as bis-(3-triethyoxysilylpropyl) tetrasulfide which is known commercially as Si69. With the coupling agent acting as an intermediary, the compound viscosity is reduced and the silica particles are more easily dispersed into the elastomeric matrix. However, such silica coupling agents are expensive. In addition, the reaction of the alkoxy portion of the coupling agent with the rubber can result in the release of a substantial amount of alcohol, resulting in a rubber compound containing undesirable bubbles that may form blisters or surface defects in the resulting formed rubber articles.

To address the expense and other problems related to bifunctional silica coupling agents, recent approaches to providing improved dispersion of silica in rubber compounds have been directed to reducing or replacing the use of such silica coupling agents by employing dispersing agents, such as monofunctional silica shielding agents (e.g., silica hydrophobating agents that chemically react with the surface silanol groups on the silica particles but are not reactive with the elastomer) and agents which physically shield the silanol groups, to prevent reagglomeration of the silica particles after compounding. For example, dispersing agents, such as alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, and fillers such as mica, talc, urea, clay, sodium sulfate, and the like, are the subjects of our copending, co-owned U.S. patent applications, Ser. Nos. 08/893,864; 08/893,875; 08/985,859; and 09/203,438. Such silica dispersing agents can be used to replace all or part of expensive bifunctional silica coupling agents, while improving the processability of silica-filled rubber compounds by reducing the compound viscosity, increasing the scorch time, and reducing silica reagglomeration. The use of such dispersing aids includes employing an increased amount of sulfur, to replace sulfur that otherwise would have been supplied by a sulfur-containing silica coupling agent, in order to achieve a satisfactory cure of the rubber compound.

Although the above-described silica dispersing agents provide good silica dispersion in vulcanizable elastomeric compounds, there is still a need for other silica dispersing agents that can be similarly used.

SUMMARY OF THE INVENTION

The present invention provides a processing aid for improving the dispersion of silica in a sulfur-vulcanizable elastomeric composition while eliminating or reducing the use of a bifunctional silica coupling agent. In particular, the processing aid of the invention comprises one or more monofunctional alkyl tin compounds, selected from the group of alkyl tin compounds having the formula

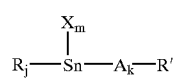

wherein R is independently selected from the group consisting of primary, secondary and tertiary alkyl groups having 1 to about 30 carbon atoms, alkaryl groups having about 6 to about 30 carbon atoms, and cycloaliphatic groups having about 5 to about 30 carbon atoms; A is independently selected from an oxy group and a carboxylate group; X is a halogen; R' is independently selected from hydrogen, $C_1$ to about $C_{20}$ saturated or unsaturated aliphatics, about $C_5$ to about $C_{20}$ cycloaliphatic, and about $C_6$ to about $Q_0$ aromatic; "j" is an integer equal to 1 to 3; "m" is an integer equal to zero to 3; and "k" is an integer equal to zero to 3; and (j+k+m) equals 4; wherein when "k" is 2 or greater, R' optionally forms a bridge between two A groups.

As used herein, the term "monofunctional" in reference to the subject alkyl tin compound(s) is defined as an alkyl tin compound having a first end comprising at least one constituent group that is chemically reactive with silica (i.e., by covalent bonding), and having a second end comprising a constituent group that is compatible with, but does not form a covalent bond with, the elastomer. For example, the chemically reactive groups may comprise tin in combination with an oxy, carboxylate and/or a halogen group; whereas the R and R' tail(s) are non-polar groups that may be weakly reactive with the elastomer by hydrogen bonding, van der Waals forces, and the like.

The terms "processing aid" and "dispersing aid" are used interchangeably herein to refer to the dispersion of reinforcing filler, especially silica, in the compositions.

Exemplary monofunctional alkyl tin compounds for use as processing aids in the compositions of the invention include, but are not limited to, butyltin tris-(2-ethylhexanoate), butyltin chloride dihydroxide, butyltin hydroxide oxide hydrate, dibutyltin dilaurate, and dibutyltin dimaleate. Mixtures of monofunctional alkyl tin compounds may also be employed.

The present invention provides a vulcanizable elastomeric composition comprising an elastomer, a reinforcing filler comprising silica or a mixture thereof with carbon black, a processing aid comprising a monofunctional alkyl tin compound, at least one cure agent, and a sufficient amount of sulfur to achieve a satisfactory cure of the composition. The alkyl tin compound is present in an amount of about 0.1% to about 150% by weight based on the weight of the silica. Preferably, the alkyl tin compound is present in an amount of about 0.5% to about 50% by weight and, more preferably, in the amount of about 1% to about 30% by weight based on the weight of the silica.

In another embodiment, the invention provides a process for the preparation of a vulcanized elastomeric composition comprising the steps of a) mixing an elastomer with a reinforcing filler comprising silica or a mixture thereof with carbon black, a processing aid comprising a monofunctional alkyl tin compound, at least one cure agent, and a sufficient amount of sulfur to achieve a satisfactory cure of the composition; and b) effecting vulcanization.

The use of an alkyl tin compound as a processing aid results in a reduction of the compound Mooney viscosity to a level that is comparable to a composition employing a polysulfide silica coupling agent, such as Si69 and the like; and provides a longer processing time window during the extrusion process to facilitate filling of the tire mold during cure. Moreover, the use of an alkyl tin compound as a processing aid results in an improved scorch time, reduced silica flocculation, lower silica network buildup, improved mold flow control of filler morphologies in the green state, and improved cure rate. These properties, in vulcanized articles utilizing the present invention, are indicative of improved hysteresis which, in turn, results in equivalent or better rolling resistance, wet, ice and snow traction, and improved fuel economy for vehicles equipped with such tires.

In another embodiment of the invention, the vulcanizable elastomeric composition further comprises, in addition to the monofunctional alkyl tin compound, an additional processing aid, such as an alkyl alkoxysilane, a fatty acid ester of hydrogenated or non-hydrogenated $C_5$ and $C_6$ sugars, the polyoxyethylene derivatives thereof, or a mineral or non-mineral additional filler, such as mica, talc, clay, aluminum hydrate, urea, sodium sulfate, and the like. For example, the addition of another processing aid, such as an alkyl alkoxysilane, to the composition containing the monofunctional alkyl tin compound results in a further reduction in the compound Mooney viscosity, improved silica flocculation stability after compounding, and improved scorch time and cure rate.

The invention further provides a pneumatic tire comprising at least one component produced from the vulcanized elastomeric composition containing the monofunctional alkyl tin compound processing aid.

DETAILED DESCRIPTION OF THE INVENTION

It has been discovered that the use of a monofunctional alkyl tin compound as a dispersing aid for silica filler in a vulcanizable elastomeric composition, in the absence of other silica coupling agents or silica shielding agents, improves the processability of the rubber compositions by, for example, reducing the compound viscosity and increasing the scorch time, compared to silica-filled elastomeric compositions not containing the processing aid. Moreover, it has been discovered that rubber compositions processed using a monofunctional alkyl tin compound as a processing aid, in the absence of other silica coupling agents or silica shielding agents, surprisingly possess favorable viscoelastic properties. These improved properties include a lower elastic modulus (G') at −20° C., a higher tan δ at 0° C., and a lower tan δ at 50° C. Such properties have been commonly used in the tire industry to predict tire performance in the categories of snow and ice traction (G' at −20° C.), wet traction (tan δ at 0° C.), and rolling resistance (tan δ at 50° C.). Rubber stocks containing monofunctional alkyl tin compounds as filler dispersing aids also exhibit a reduced Payne effect (i.e., a lower silica network build-up after compounding) and improved filler dispersion, which will result in lower hysteresis in the vulcanized product.

The processing aid in the invention vulcanizable elastomeric composition comprises a monofunctional alkyl tin compound selected from a group of alkyl tin compounds having the formula

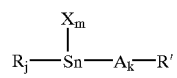

wherein R is independently selected from the group consisting of primary, secondary and tertiary alkyl groups having 1 to about 30 carbon atoms, alkaryl groups having about 6 to about 30 carbon atoms, and cycloaliphatic groups having about 5 to about 30 carbon atoms; A is independently selected from an oxy group and a carboxylate group; X is a halogen; R' is independently selected from hydrogen, $C_1$ to about $C_{20}$ saturated or unsaturated aliphatics, about $C_5$ to about $C_{20}$ cycloaliphatic, and about $C_6$ to about $C_{20}$ aromatic; "j" is an integer equal to 1 to 3; "m" is an integer equal to zero to 3; and "k" is an integer equal to zero to 3; and (j+k+m) equals 4; wherein when "k" is 2 or greater, R' optionally forms a bridge between two A groups.

Exemplary processing aids of the invention include, but are not limited to, butyltin tris-(2-ethylhexanoate), butyltin chloride dihydroxide, butyltin hydroxide oxide hydrate, dibutyltin dilaurate, and dibutyltin dimaleate. Mixtures of monofunctional alkyl tin compounds may also be employed.

The alkyl tin compound is present in the vulcanizable elastomeric composition in an amount of about 0.1% to about 150% by weight based on the weight of the silica. Preferably the alkyl tin compound is present in an amount of about 0.5% to about 50% by weight and, more preferably, in the amount of about 1% to about 30% by weight based on the weight of the silica.

The alkyl tin compound processing aid may be added separately to the elastomer or may be fully or partially supported on the reinforcing filler. The ratio of the alkyl tin compound to the reinforcing filler is not critical. If the alkyl tin compound is a liquid, a suitable ratio of alkyl tin compound to filler is that which results in a suitably dry material for addition to the elastomer. For example, the ratio may be about 1/99 to about 70/30, about 20/80 about 60/40, about 50/50, and the like.

The monofunctional alkyl tin compound processing aid of the invention may be used as a silica dispersing aid to replace all or at least a portion of a bifunctional silica coupling agent in a sulfur-vulcanizable elastomeric compositions. However, it has been found herein that when a sulfur-containing silica coupling agent is absent or reduced in concentration, an appropriate adjustment in the amount of sulfur added to the elastomeric composition is necessary to achieve a satisfactory cure of the composition. For example, an effective amount of sulfur in an invention composition would provide a property of the cured compound that is approximately equal to the same property of a satisfactorily cured compound containing Si69 or a mercaptosilane with a conventional amount of sulfur (e.g., about 1.4 to about 2.5 phr). Exemplary cured properties for comparison include, but are not limited to, the value of the 300% Modulus (psi), the molecular weight between crosslinks (Mc g/mol), and the like, and other cured properties that are well known to those skilled in the art of rubber making. The increased amount of sulfur to compensate for the reduced availability of sulfur from a sulfur-donating silica coupling agent will vary from composition to composition, depending on the amount of silica and the amount, if any, of a sulfur-donating silica coupling agent present in the formulation. Based on the disclosure contained herein, and in the examples of invention compositions described below, one skilled in the art of rubber compounding may easily determine the effective amount of sulfur required for a satisfactory cure of the compound without undue experimentation. The additional sulfur may take any form, including soluble sulfur, insoluble sulfur, or any of the sulfur-donating compounds described as vulcanizing agents below, or mixtures of the foregoing.

Although the alkyl tin compound may be used alone as a dispersing/processing aid in the present invention to produce vulcanizable elastomeric compositions and vulcanized rubber products exhibiting favorable physical properties, it has also been discovered that these properties show a greater improvement when the monofunctional alkyl tin compound is used in conjunction with additional dispersing aids. Therefore, in another embodiment of the invention, the vulcanizable elastomeric composition comprises an additional dispersing aid, such as an alkyl alkoxysilane, a fatty acid ester of hydrogenated or non-hydrogenated $C_5$ and $C_6$ sugars, and the polyoxyethylene derivatives thereof, or a mineral or non-mineral additional filler, as described below.

Alkyl alkoxysilanes useful as an additional processing aid preferably have the formula

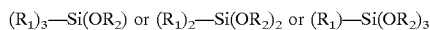

$(R_1)_3-Si(OR_2)$ or $(R_1)_2-Si(OR_2)_2$ or $(R_1)-Si(OR_2)_3$ where the alkoxy groups are the same or are different from each other; each $R_1$ independently comprises a $C_1$ to about $C_{20}$ aliphatic, about $C_5$ to about $C_{20}$ cycloaliphatic, or about $C_5$ to about $C_{20}$ aromatic group; and each $R_2$ independently comprises from one to about 6 carbon atoms. Preferably, $R_1$ comprises a $C_1$ to about $C_{10}$ aliphatic, about $C_6$ to about $C_{10}$ cycloaliphatic, or about $C_6$ to about $C_{12}$ aromatic group.

Exemplary alkyl alkoxysilanes include, but are not limited to, octyl triethoxysilane, octyl trimethoxysilane, trimethyl ethoxysilane, silyl ethoxysilane, cyclohexyl triethoxysilane, iso-butyl triethoxysilane, ethyl trimethoxy silane, hexyl tributoxy silane, dimethyl diethoxysilane, methyl triethoxysilane, propyl triethoxysilane, hexyl triethoxysilane, heptyl triethoxysilane, nonyl triethoxysilane, octadecyl tiethoxysilane, methyl octyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyl octyl dimethoxysilane, and mixtures thereof. Because alcohol is released when the alkyl alkoxysilane reacts with the surface of the silica particle, it is preferred for environmental reasons that ethoxysilanes are employed, rather than methoxysilanes, although methoxysilanes are not excluded from the invention. Preferred alkyl alkoxysilane processing aids are octyl triethoxysilane, octadecyl triethoxysilane, and nonyl triethoxysilane.

The alkyl alkoxysilane, if used, may be present in an amount of about 0.1% to about 150% by weight based on the weight of the silica. Preferably, the alkyl alkoxysilane may be present in an amount of about 0.5% to about 50% by weight and, more preferably, in an amount of about 1% to about 30% by weight based on the weight of the silica. If desired, the alkyl alkoxysilane may be fully or partially supported by the reinforcing filler. The ratio of the alkyl alkoxysilane to the reinforcing filler is not critical. For example, the ratio may be about 1/99 to about 70/30, about 20/80 about 60/40, about 50/50, and the like. The addition of the alkyl alkoxysilane processing aid to the composition results in a further reduction in the compound Mooney viscosity, improved silica flocculation stability, and improved scorch time and cure rate.

Exemplary fatty acid esters of hydrogenated and non-hydrogenated $C_5$ and $C_6$ sugars (e.g., sorbose, mannose, and arabinose) that are useful as an additional processing aid include the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. Generally, a useful amount of these additional processing aids is about 0.1% to about 60% by weight based on the weight of the silica, with about 0.5% to about 50% by weight being preferred, and about 1% to about 30% by weight based on the weight of the silica being more preferred. Esters of polyols, including glycols such as polyhydroxy compounds and the like, in the same quantities, are also useful.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals. Generally, a useful amount of these additional processing aids is about 0.1% to about 60% by weight based on the weight of the silica, with about 0.5% to about 50% by weight being preferred, and about 1% to about 30% by weight based on the weight of the silica being more preferred.

The fatty acid esters described above, and their polyoxyethylene derivatives, may be fully or partially supported by the reinforcing filler. The ratio of the dispersing agent to the reinforcing filler is not critical. If the dispersing agent is a liquid, a suitable ratio of dispersing agent to filler is that which results in a suitably dry material for addition to the elastomer. For example, the ratio may be about 1/99 to about 70/30, about 20/80 about 60/40, about 50/50, and the like.

Certain additional fillers can be utilized according to the present invention as processing aids, including mineral fillers, such as clay (hydrous aluminum silicate), talc (hydrous magnesium silicate), aluminum hydrate [$Al(OH)_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support the alkyl tin compound processing aids, as well as any of the optional additional processing aids described above. As with the support of the processing aid on the reinforcing filler, as described above, the ratio of processing aid to non-reinforcing filler is not critical. For example, the ratio may be about 1/99 to about 70/30, about 20/80 about 60/40, about 50/50, and the like.

The present invention can be used in conjunction with any anionically polymerized elastomer. For example, conjugated diene monomers, monovinyl aromatic monomers, triene monomers, and the like, may be anionically polymerized to form conjugated diene polymers, or copolymers or terpolymers of conjugated diene monomers and monovinyl aromatic monomers (e.g., styrene, alpha methyl styrene and the like) and triene monomers. Thus, the elastomeric products may include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 10 percent by weight of diene units and from about one to about 90 percent by weight of monovinyl aromatic or triene units, totaling 100 percent. The polymers, copolymers and terpolymers of the present invention may have 1,2-microstructure contents ranging from about 10 percent to about 80 percent, with the preferred polymers, copolymers or terpolymers having 1,2-microstructure content of from about 25 to 65 percent, based upon the diene content. The elastomeric copolymers are preferably random copolymers which result from simultaneous copolymerization of the monomers A and B with randomizing agents, as is known in the art.

Preferred polymers for use in a vulcanizable elastomeric composition of the invention include polyisoprene, polystyrene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, organo-tin, and organo-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms, and preferably from about 2 to about 8 carbon atoms. Although the hydrocarbyl group is preferably an aliphatic group, the hydrocarbyl group can also be cycloaliphatic or aromatic. The aliphatic group may be a primary, secondary, or tertiary group, although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes include, but are not limited to, n-butyl lithium, n-propyl lithium, iso-butyl lithium, tert-butyl lithium, tributyl tin lithium (described in our co-owned U.S. Pat. No. 5,268,439), amyl-lithium, cyclohexyl lithium, and the like. Other suitable organo-lithium compounds for use as anionic initiators are well known to those skilled in the art. A mixture of different lithium initiator compounds also can be employed. The preferred organo-lithium initiators are n-butyl lithium, tributyl tin lithium and "in situ" produced lithium hexamethyleneimide initiator prepared by reacting hexamethyleneimine and n-butyl lithium (described in our co-owned U.S. Pat. No. 5,496,940).

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles (mM) of lithium per 100 grams of monomers up to about 100 mM of lithium per 100 grams of monomers, depending upon the desired polymer molecular weight.

Polymerization is usually conducted in a conventional solvent for anionic polymerizations, such as hexane, cyclohexane, benzene and the like. Various techniques for polymerization, such as semi-batch and continuous polymerization may be employed.

In order to promote randomization in co-polymerization and to increase vinyl content, a polar coordinator may optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2'-di(tetrahydrofuryl) propane, dipiperidyl ethane, hexamethyl phosphoramide, N-N'-dimethyl piperazine, diazabicyclo octane, dimethyl ether, diethyl ether, tributyl amine and the like. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is preferred to maintain the peak temperature at from about 50° C. to about 150° C. and, more preferably, from about 60° C. to about 100° C. Polymerization is allowed to continue under agitation for about 0.15 hours to 24 hours. After polymerization is complete, the product is terminated by a quenching agent, an endcapping agent and/or a coupling agent, as described herein below. The terminating agent is added to the reaction vessel, and the vessel is agitated for about 0.1 hours to about 4.0 hours. Quenching is usually conducted by stirring the polymer and quenching agent for about 0.01 hours to about 1.0 hour at temperatures of from about 20° C. to about 120° C. to ensure a complete reaction. Polymers terminated with a functional group, as discussed herein below, are subsequently quenched with alcohol or other quenching agent as also described herein below.

Lastly, the solvent is removed from the polymer by conventional techniques such as drum drying, extruder drying, vacuum drying or the like, which may be combined with coagulation with water, alcohol or steam. If coagulation with water or steam is used, oven drying may be desirable.

One way to terminate the polymerization reaction is to employ a protic quenching agent to give a monofanctional polymer chain. Quenching may be conducted in water, steam or an alcohol such as isopropanol, or any other suitable method. Quenching may also be conducted with a functional terminating agent, resulting in a difunctional polymer. Any compounds providing terminal functionality (i.e., endcapping) that are reactive with the polymer bound carbon-magnesium-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and mixtures thereof. Further examples of reactive compounds include the terminators described in our co-owned U.S. Pat. Nos. 5,521,309 and 5,066,729, the subject matter of which, pertaining to terminating agents and terminating reactions, is hereby incorporated by reference. Other useful terminating agents may include those of the structural formula $(R)_a ZX_b$, where Z is tin or silicon. It is preferred that Z is tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R may include methyl, ethyl, n-butyl, neophyl, phenyl, cyclohexyl or the like. X is a halogen, such as chlorine or bromine, or alkoxy (—OR), "a" is an integer from zero to 2, and "b" is an integer from one to 4, where a+b=4. Examples of such terminating agents include tin tetrachloride, tributyl tin chloride, butyl tin trichloride, butyl silicon trichloride, as well as tetraethoxysilane $(Si(OEt)_4)$, and methyl triphenoxysilane $(MeSi(OPh)_3)$. The practice of the present invention is not limited solely to these terminators, since other compounds that are reactive with the polymer bound carbon-lithium moiety can be selected to provide a desired functional group.

While terminating to provide a functional group on the terminal end of the polymer is preferred, it is further preferred to terminate by a coupling reaction with, for example, tin tetrachloride or other coupling agent such as silicon tetrachloride or esters. High levels of tin coupling are desirable in order to maintain good processability in the subsequent manufacturing of rubber products. It is preferred that the polymers for use in the vulcanizable elastomeric compositions according to the present invention have at least about 40 percent tin coupling. That is, about 40 percent of the polymer mass after coupling is of higher molecular weight than the polymer before coupling as measured, for example, by gel permeation chromatography. Preferably, before coupling, the polydispersity (the ratio of the weight average molecular weight to the number average molecular weight) of polymers, which can be controlled over a wide range, is from about one to about 5, preferably one to about 2 and, more preferably, one to about 1.5.

As noted above, various techniques known in the art for carrying out polymerizations may be used to produce elastomers polymers suitable for use in the vulcanizable elastomeric compositions, without departing from the scope of the present invention.

Vulcanizable elastomeric compositions of the invention are prepared by mixing an elastomer with silica, or a mixture of silica and carbon black, and a monofunctional alkyl tin compound processing aid, preferably with the addition of at least one additional processing aid such as alkyl alkoxysilanes, fatty acid esters or their polyoxyethylene derivatives, as described above, or polyol esters, in addition to other conventional rubber additives including, for example, other fillers, plasticizers, antioxidants, cure agents and the like, using standard rubber mixing equipment and procedures. Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

The preferred conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

The vulcanizable elastomeric composition is preferably compounded with reinforcing fillers, such as silica, or a mixture of silica and carbon black. Examples of silica fillers which may be used in the vulcanizable elastomeric composition of the invention include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 100 parts per hundred parts of the elastomer, preferably in an amount of about five to about 80 phr and, more preferably, in an amount of about 30 to about 80 phr. The useful upper range is limited by the high viscosity imparted by fillers of this type. Some of the commercially available silicas which may be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165 MP), and J. M. Huber Corporation.

The elastomers can be compounded with all forms of carbon black in a mixture with the silica. The carbon black may be present in amounts ranging from about one to about 50 phr, with about five to about 35 phr being preferred. The carbon blacks may include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention may be in pelletized form or an unpelletized flocculent mass. Preferably, for more uniform mixing, unpelletized carbon black is preferred.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Representative antioxidants may be, for example diphenyl-p-phenylenediamine and others, such as for example, those disclosed in the *Vanderbilt Rubber Handbook* (1978), pages 344 to 346. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about two to about 5 phr. Typical amounts of waxes comprise about one to about 2 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The reinforced rubber compounds can be cured in a conventional manner with known vulcanizing agents at about 0.1 to 10 pbr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, more preferably about 1.5 to about 5 phr, with a range of about 1.5 to about 3.5 phr being most preferred.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr, preferably about 0.2 to about 3 phr.

The vulcanizable elastomeric composition of the present invention can be obtained by milling the components by using a milling apparatus, such as a mill, an internal mixer, and the like for a sufficient time and at a high enough temperature to achieve the desired physical properties of the resulting compound. The mixing of the vulcanizable elastomeric composition can be accomplished by methods known to those having skill in the rubber mixing art. For example, the ingredients may be mixed in two or more stages, consisting of at least a "master batch" stage (comprising mixing of the elastomer, with at least a portion of the silica and/or carbon black and other ingredients); and a "final stage", in which the cure agents are typically added. There may also be a mixing stage in which the mixture is re-milled without the addition of ingredients. The monofunctional alkyl tin compound processing aid may be added in any stage of the mixing process.

The mixing temperature may vary from stage to stage. However, for purposes of the invention, the monofunctional alkyl tin compound processing aid and the silica filler may be mixed at a mixing temperature of about 60° C. to about 200° C., typically 90° C. to about 190° C. and, more preferably, about 120° C. to about 180° C. In one embodiment of the invention, a portion of the silica and/or monofunctional alkyl tin compound processing aid, or additional dispersing aids, may be added to the master batch stage, and the remainder added to a remill stage.

EXAMPLES

The following examples illustrate methods of preparation of the vulcanizable elastomeric composition of the present invention. However, the examples are not intended to be limiting, as other methods for preparing these compositions and different compounding formulations may be determined by those skilled in the art. Thus, the invention is not limited to the specific elastomers, monofunctional alkyl tin compounds or additional processing aids, silica, or other compound ingredients disclosed, nor to any particular amount of an ingredient in the composition. Moreover, the invention is not limited to the mixing times or temperatures, or to the stage in which the particular ingredients are added to the mixer. The examples have been provided merely to demonstrate the practice of the subject invention and do not constitute limitations of the invention. Those skilled in the art may readily select other elastomers, monofunctional alkyl tin compounds, alkyl alkoxysilanes, additional dispersing aids, silica coupling agents, and the like, and process conditions, according to the disclosure made hereinabove. Thus, it is believed that any of the variables disclosed herein can readily be determined and controlled without departing from the scope of the invention herein disclosed and described.

Example 1

In order to demonstrate the preparation and properties of the vulcanizable elastomeric composition of the present invention, five stocks of rubbers were prepared using the compounding formulation and mixing conditions shown in Tables 1 and 2. Each of three stocks were prepared in which a monofunctional alkyl tin processing aid of the invention was added to the elastomer/silica/carbon black composition, as illustrated in Table 3. These stocks are labeled Examples 1, 2 and 3, and contain 3 parts of butyltin tris-(2-ethylhexanoate), buyltin chloride dihydroxide, or butyltin hydroxide oxide hydrate, respectively. The monofunctional alkyl tin compounds were obtained from Sigma-Aldrich Corporation (Milwaukee, Wis.) and were used without further purification. For comparison purposes, another stock was compounded without adding any dispersing aids or silica coupling agents to the mixture. This stock was labeled Control A. A second control stock, labeled Control B, was compounded with the elastomer, silica, and 3 phr of a polysulfide silica coupling agent. The total sulfur content of each stock not containing a polysulfide silica coupling agent was adjusted to compensate for the reduction in the amount of sulfur in comparison with that donated from the polysulfide silica coupling agent in Control B. The final stocks were sheeted and subsequently molded at 171° C. for 15 minutes.

TABLE 1

Formulations of Stock Rubbers

| Ingredient | Amount (phr) |
|---|---|
| Natural Rubber | 25 |
| Solution SBR | 75 |
| Carbon Black (SAF) | 32 |
| Precipitated Silica | 30 |
| Processing Aid | varied |
| Naphthenic Process Oil | 1.5 |
| Wax | 1.5 |
| Antioxidant | 0.95 |
| Sulfur | varied |
| Accelerator | 1.5 |
| Zinc Oxide | 2.5 |
| Diphenyl Guanidine | 0.5 |

TABLE 2

Mixing Conditions

| Mixer | 310 g Brabender |
|---|---|
| Agitation Speed | 60 rpm |
| | Master Batch Stage |
| Initial Temperature | 100° C. |
| 0 seconds | charging polymers |
| 30 seconds | charging carbon black, silica, alkyl tin compound, alkyl alkoxysilanes and/or other processing aids (if used), and all pigments |
| 5 minutes | drop |
| Drop Temperature | 175° C. |
| | Remill 1 Stage |
| Initial Temperature | 70° C. |
| 0 seconds | charging master batch stock |
| 30 seconds | charging Si69, if added |
| Drop Temperature | 155° C. |
| | Final Batch Stage |
| Initial Temperature | 90° C. |
| 0 seconds | charging remilled stock |
| 30 seconds | charging cure agent and accelerators |
| Drop Temperature | 105° C. |

TABLE 3

Stocks with various shielding agents and silane

| Stock Number | Si69 (phr) | Butyltin tris(2-ethylhexanoate) (phr) | Butyltin dihydroxy chloride (phr) | Butyltin hydroxide oxide hydrate (phr) | Sulfur (phr) |
|---|---|---|---|---|---|
| Control A | 0 | 0 | 0 | 0 | 2.37 |
| Control B | 3 | 0 | 0 | 0 | 1.70 |
| Example 1 | 0 | 3 | 0 | 0 | 2.37 |
| Example 2 | 0 | 0 | 3 | 0 | 2.37 |
| Example 3 | 0 | 0 | 0 | 3 | 2.37 |

The green stock (i.e., the stock obtained after the remill stage, prior to adding the curatives) was characterized as to Mooney viscosity and Payne effect ($\Delta G'$) and cure characteristics. The Mooney viscosity measurement was conducted at 130° C. using a large rotor, and was recorded as the torque when rotor had rotated for 4 minutes. The sample was preheated at 130° C. for 1 minute before the rotor was started. The $t_5$ is the time required for the viscosity to increase by five Mooney units during a Mooney-scorch measurement. It is used as an index to predict how fast the compound viscosity will increase during processing (e.g., during extrusion). $t_{S2}$ and $t_{90}$ are the times taken for a torque increase of 2% and 90%, respectively, of the total torque increase during the cure characterization test. These values are useful in predicting the speed of the viscosity increase ($t_{S2}$) and the cure rate during the cure process ($t_{90}$). The Payne effect of the green stock (prior to cure) compounds were measured using the RPA 2000 viscometer (Alpha Technologies). The strain sweep experiment was conducted at 50° C. at 6 cycles per minute (cpm) using strain sweeping from 0.25 percent to 1000%.

The results of the testing are illustrated in Table 4. The results show that with the addition of a processing aid comprising a monofunctional alkyl tin compound, the compound Mooney viscosity is greatly reduced. Except for the butyltin tris(2-ethylhexanoate), the addition of a processing aid comprising a monofunctional alkyl tin compound to the stocks of Examples 2 and 3 reduced viscosities to a level comparable to that of Control B, which contains the polysulfide silane Si69. A reduced compound Mooney viscosity is advantageous because it provides better processability and handling, especially during the extrusion process. In contrast, a high compound Mooney viscosity may cause subsequent tire build problems, for example, difficulties in filling the tire mold during the cure step, and may result in modulated inner belts in the tires. When compared to Control A and Control B, the longer $t_{S2}$ values in the monofunctional alkyl tin containing stocks (Examples 1, 2, and 3) allow for adequate time to flow and better fill the mold. Additionally, the relatively fast cure rate ($t_{90}$) of the monofunctional alkyl tin compound stocks (Examples 1, 2, and 3) is greatly beneficial.

TABLE 4

The green stock Mooney and Cure Characteristics

| Stock Number | Mooney Viscosity @ 130° C. | $t_5$ Scorch @ 130° C. (min) | Δ G' (G' @ 0.25%– G' @ 1000%) (kPa) | $t_{S2}$ @ 171° C. (min) | $t_{90}$ @ 171° C. (min) |
|---|---|---|---|---|---|
| Control A | 85.5 | 10.12 | 1364 | 1.35 | 11.08 |
| Control B | 56.0 | 18.73 | 794 | 2.19 | 7.14 |
| Example 1 | 62.8 | 24.37 | 1004 | 2.61 | 6.86 |
| Example 2 | 57.3 | 31.45 | 907 | 2.87 | 6.94 |
| Example 3 | 57.3 | 23.20 | 773 | 2.41 | 4.92 |

The dynamic viscoelastic properties of the Examples 1, 2, and 3 and the Controls A and B are illustrated in Table 5 where the elastic modulus (G') at –20° C., tan δ at 0° C. and tan δ at 50° C. were obtained from temperature sweep experiments. Temperature sweep tests were conducted with a frequency of 31.4 radians per second (rad/sec) employing 0.5% strain at temperatures ranging from –100° C. to –10° C., and 2% strain for temperatures ranging from –10° C. to 100° C. The Payne effect (ΔG') and tan δ at 7% strain were obtained from the strain sweep tests. A frequency of 3.14 rad/sec was used for stain sweep conducted at 65° C. with strain sweeping from 0.25% to 14.75%.

As illustrated in Table 5, the presence of the processing aid comprising a monofunctional alkyl tin compound enhanced the tan δ at 0° C., and reduced the tan δ at 50° C., of the test compounds compared to Control A. These results are indicative of improvements in the tire wet traction and rolling resistance. The presence of the processing aid comprising a monofunctional alkyl tin compound also reduced the Payne effect (ΔG') and tan δ at 7% strain of the test compounds compared to Control A. These results indicate that the stocks (Examples 1, 2, and 3) containing the processing aid comprising a monofunctional alkyl tin compound have reduced silica flocculation after compounding and reduced hysteresis. Compared to Control B, containing a polysulfide coupling agent, Examples 1, 2, and 3, containing the processing aid comprising a monofunctional alkyl tin compound, show comparable wet traction (tan δ at 0° C.), and rolling resistance (tan δ at 50° C.) values.

TABLE 5

The Viscoelastic Properties Measured by Temperature and Strain Sweeps

| Stock Number | G' @ –20° C. (MPa) | tan δ @ 0° C. | tan δ @ 50° C. | Δ G' (MPa) (G' @ 0.25%– G' @ 14.75%) @ 65° C. | tan δ @ 7% Strain @ 65° C. |
|---|---|---|---|---|---|
| Control A | 50.3 | 0.2825 | 0.1844 | 2.32 | 0.1376 |
| Control B | 39.0 | 0.3308 | 0.1737 | 1.36 | 0.1018 |
| Example 1 | 49.0 | 0.3138 | 0.1686 | 1.80 | 0.1098 |
| Example 2 | 49.8 | 0.3304 | 0.1746 | 2.03 | 0.1213 |
| Example 3 | 66.5 | 0.3472 | 0.1741 | 1.69 | 0.0945 |

The tensile mechanical properties were measured using the standard procedure described in ASTM D-412 at 25° C. and are shown in Table 6. The tensile test specimens were round rings with a dimension of 0.127 centimeters (cm) (0.05 inches) in width and 0.191 cm (0.075 inches) in thickness. A specific gauge length of 2.54 cm (1 inch) was used for the tensile test. Examples 1, 2, and 3 showed inferior tensile mechanical properties compared to Controls A and B. The lower elastic modulus of the stocks containing a monofunctional alkyl tin compound suggests a lower crosslink density which would lead to the lower mechanical strength and toughness. Crosslink density can be increased with an increase in the amount of sulfur added to a formulation.

TABLE 6

Tensile Mechanical Properties at 25° C.

| Stock Number | M50 (psi) | M300 (psi) | Strength, Tb (psi) | Elongation at break, Eb (%) | Toughness (psi) |
|---|---|---|---|---|---|
| Control A | 206 | 1435 | 2480 | 442 | 4641 |
| Control B | 250 | 2232 | 2924 | 369 | 4630 |
| Example 1 | 172 | 1372 | 2141 | 406 | 3585 |
| Example 2 | 180 | 1390 | 2071 | 389 | 3294 |
| Example 3 | 197 | 1566 | 2110 | 365 | 3206 |

Example 2

In order to reduce the Payne effect (ΔG'), and G' at –20° C. in monofunctional alkyl tin compound containing stocks, a small amount of octyl triethoxysilane was added to the monofunctional alkyl tin containing stocks. Examples 4, 5, and 6 were compounded with the octyl triethoxysilane and a monofanctional alkyl tin compound. Controls C and D were tested to provide data regarding the effect of adding no processing aid (Control C) and adding a polysulfide coupling agent (Control D). Another control stock (Control E) was prepared with 1.04 phr of octyl triethoxysilane but with no other processing aid. The insoluble sulfur level was increased from 2.37 phr to 2.57 phr.

TABLE 7

Stocks with various processing aids and silanes

| Stock Number | Si69 (phr) | Octyl triethoxy silane (phr) | Butyltin tris(2-ethyl-hexanoate) (phr) | Butyltin dihydroxy chloride (phr) | Butyltin hydroxide oxide hydrate (phr) | Sulfur (phr) |
|---|---|---|---|---|---|---|
| Control C | 0 | 0 | 0 | 0 | 0 | 2.57 |
| Control D | 3 | 0 | 0 | 0 | 0 | 1.70 |
| Control E | 0 | 1.04 | 0 | 0 | 0 | 2.57 |
| Example 4 | 0 | 1.04 | 3 | 0 | 0 | 2.57 |
| Example 5 | 0 | 1.04 | 0 | 3 | 0 | 2.57 |
| Example 6 | 0 | 1.04 | 0 | 0 | 3 | 2.57 |

The dynamic viscoelastic properties of Controls C, D, and E and Examples 4, 5, and 6 are listed in Table 8. As illustrated, the G' at −20° C. and ΔG' of stocks containing a monofunctional alkyl tin compound and octyl triethoxysilane (i.e., Examples 4, 5, and 6) are comparable to the value of the polysulfide coupling agent stock (Control D). The tan δ of Examples 4, 5, and 6 at 0° C. are higher and tan δ at 50° C. are lower compared to Control C. The improvement in these values was completely unexpected and will result in improved wet traction and rolling resistance. The improvement in the properties is attributable to the efficacy of the shielding agents, the improvements are not attributable to the increase in sulfur.

TABLE 8

The Viscoelastic Properties measured by Temperatures and Strain Sweeps

| Stock Number | G' @ −20° C. (MPa) | tan δ @ 0° C. | tan δ @ 50° C. | Δ G' (MPa) @ 65° C. (G' @ 0.25%– G' @ 14.75%) | tan δ @ 7% Strain @ 65° C. |
|---|---|---|---|---|---|
| Control C | 40.4 | 0.2861 | 0.1806 | 3.255 | 0.1448 |
| Control D | 31.1 | 0.3074 | 0.1582 | 1.625 | 0.1232 |
| Control E | 37.8 | 0.3060 | 0.1788 | 2.617 | 0.1373 |
| Example 4 | 32.5 | 0.3188 | 0.1481 | 1.425 | 0.1039 |
| Example 5 | 36.6 | 0.3208 | 0.1524 | 1.960 | 0.1270 |
| Example 6 | 34.5 | 0.3283 | 0.1459 | 1.712 | 0.1046 |

The compound Mooney viscosity and cure characteristics of these stocks are shown in Table 9. With the addition of small amounts of alkyl alkoxysilane in the monofunctional alkyl tin compound-containing stocks (i.e., Examples 4, 5, and 6), both the Mooney and Payne effect (ΔG') are further reduced and are even lower than the polysulfide coupling agent stock (Control D). The scorch ($t_5$ and $t_{S2}$) times of Examples 4, 5, and 6 are longer than Controls C, D, and E. The cure rate ($t_{90}$) of Examples 4, 5, and 6 is faster than Controls C, D, and E. The data in Table 9 shows that Examples 4, 5, and 6 possess improved stock processabilities, as expressed in Mooney viscosities, and cure characteristics, as expressed as $t_5$, $t_{S2}$. and $t_{90}$ as well as improved flocculation, as expressed by ΔG'.

TABLE 9

The Green Stock Mooney and Cure Characteristics

| Stock Number | Mooney @ 130° C. | $t_5$ Scorch @ 130° C. (minutes) | Δ G' (G' @ 0.25%– G' @ 1000%) (kPa) | $t_{S2}$ @ 171° C. (minutes) | $t_{90}$ @ 171° C. (minutes) |
|---|---|---|---|---|---|
| Control C | 81.2 | 11.03 | 1651 | 1.23 | 9.37 |
| Control D | 57.4 | 18.70 | 928 | 2.25 | 7.21 |
| Control E | 65.8 | 16.65 | 1146 | 1.90 | 7.95 |
| Example 4 | 49.9 | 27.07 | 823 | 2.87 | 6.05 |
| Example 5 | 55.4 | 29.53 | 869 | 2.78 | 5.66 |
| Example 6 | 51.8 | 25.50 | 697 | 2.55 | 4.50 |

The processing aid of the present invention acts as a shielding agent for silica filler during the a mixing stage and stabilizes the silica particles during storage and the cure process. To analyze capability of the processing aid to stabilize silica filler morphology, the Payne effect data (ΔG') obtained from the remill stocks before and after annealing at 171° C. for 15 minutes was compared, i.e., the comparison was expressed as the change in the Δ G' values (Δ(ΔG')). The annealing conditions employed are similar to conventional curing conditions. =The stocks, excluding the polysulfide coupling agent stock (Control D), do not contain curatives, therefore the ΔG' increase cannot be attributed to sulfur crosslinking. This comparison illustrates the degree to which the filler flocculates prior to cure. Results are given in Table 10. The change in ΔG' values of the monofunctional alkyl tin compound containing compositions (Examples 4, 5, and 6) of the invention are lower. Of note is Example 6, the Δ(ΔG') is only 370 kPa, which indicates very limited filler flocculation. This shows that with the use of alkyl alkoxysilane and a monofunctional alkyl tin compound as a processing aid it is possible to control and stabilize filler morphology in both the green rubber stock and cured rubber.

TABLE 10

The Δ G' of the remill stock before and after annealing at 171° C. for 15 minutes

| Stock Number | Δ G' before annealing (kpa) | Δ G' after annealing (kpa) | Change in Δ G', after minus before, (kPa) |
|---|---|---|---|
| Control C | 1936 | 4579 | 2823 |
| Control D | 964 | 2829 | 1865 |
| Control E | 1325 | 2811 | 1486 |
| Example 4 | 899 | 2073 | 1174 |
| Example 5 | 983 | 2658 | 1675 |
| Example 6 | 914 | 1284 | 370 |

The tensile mechanical properties of Examples 4, 5, and 6 are lower than Controls C, D, and E in both strength and toughness as shown in Table 11. The lower modulus (the M50 and M300 values) in the Examples 4, 5, and 6 suggests that these rubbers are undercured. Although the sulfur content of the stocks was adjusted up to compensate, as shown in Table 7, the limited miscibility of insoluble sulfur may have hindered the cure state adjustment.

TABLE 11

Tensile Mechanical Properties at 25° C.

| Stock Number | M50 (psi) | M300 (psi) | Strength, Tb (psi) | Elongation at Break, Eb (%) | Toughness (psi) |
|---|---|---|---|---|---|
| Control C | 218 | 1744 | 2379 | 377 | 3831 |
| Control D | 200 | 1959 | 2720 | 382 | 4349 |
| Control E | 180 | 1500 | 2324 | 400 | 3850 |
| Example 4 | 177 | 1560 | 2212 | 378 | 3390 |
| Example 5 | 184 | 1556 | 2147 | 371 | 3247 |
| Example 6 | 160 | 1530 | 2000 | 355 | 3000 |

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

We claim:

1. A vulcanizable elastomeric composition comprising:
   an elastomer;
   a reinforcing filler comprising silica of a mixture thereof with carbon black;
   a processing aid comprising a monofunctional alkyl tin compound, in the absence of a polysulfide silica coupling agent;
   a cure agent; and
   an effective amount of sulfur to achieve a satisfactory cure of the composition.

2. The composition of claim 1, wherein the monofunctional alkyl tin compound is selected from one or more of the group of alkyl tin compounds having the formula

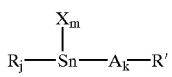

wherein R is independently selected from the group consisting of primary, secondary and tertiary alkyl groups having 1 to about 30 carbon atoms, alkaryl groups having about 6 to about 30 carbon atoms, and cycloaliphatic groups having about 5 to about 30 carbon atoms; A is independently selected from an oxy group and a carboxylate group; X is a halogen; R' is independently selected from hydrogen, $C_1$ to about $C_{20}$ saturated or unsaturated aliphatics, about $C_5$ to about $C_{20}$ cycloaliphatic, and about $C_6$ to about $C_{20}$ aromatic; "j" is an integer equal to 1 to 3; "m" is an integer equal to zero to 3; and "k" is an integer equal to zero to 3; and (j+k+m) equals 4; wherein when "k" is 2 or greater, R' optionally forms a bridge between two A groups.

3. The composition of claim 1, wherein the monofunctional alkyl tin compound is selected from the group consisting of butyltin tris-(2-ethylhexanoate), butyltin chloride dihydroxide, butyltin hydroxide oxide hydrate, dibutyltin dilaurate, dibutyltin dimaleate, and mixtures thereof.

4. The composition of claim 1, wherein the monofunctional alkyl tin compound is present in an amount of about 0.1% to about 150% by weight based on the weight of the silica.

5. The composition of claim 1, wherein the monofunctional alkyl tin compound is fully or partially supported on the reinforcing filler.

6. The composition of claim 1, wherein the composition further comprises an alkyl alkoxysilane having the formula

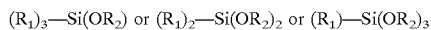

wherein the alkoxy groups are the same or are different from each other; each $R_1$ independently comprises a $C_1$ to about $C_{20}$ aliphatic, about $C_5$ to about $C_{20}$ cycloaliphatic, or about $C_5$ to about $C_{20}$ aromatic group; and each $R_2$ independently comprises from one to about 6 carbon atoms.

7. The composition of claim 6, wherein the alkyl alkoxysilane is selected from the group consisting of octyl triethoxysilane, octyl trimethoxysilane, trimethyl ethoxysilane, silyl ethoxysilane, ethyl triethoxysilane, cyclohexyl triethoxysilane, dimethyl diethoxysilane, methyl triethoxysilane, propyl triethoxysilane, hexyl triethoxysilane, heptyl triethoxysilane, nonyl triethoxysilane, octadecyl triethoxysilane, methyl octyl diethoxysilane, dimethyl dimethoxysilane, methyl trimethoxysilane, propyl trimethoxysilane, hexyl trimethoxysilane, heptyl trimethoxysilane, nonyl triethoxysilane, octadecyl triethoxysilane, methyl octyl dimethoxysilane, and mixtures thereof.

8. The composition of claim 6, wherein the alkyl alkoxysilane compound is present in an amount of about 0.1% to about 150% by weight based on the weight of the silica.

9. The composition of claim 6, wherein the alkyl alkoxysilane is fully or partially supported on the reinforcing filler.

10. The composition of claim 1, wherein the elastomer is selected from the group consisting of homopolymers of a conjugated diene monomer; and copolymers and terpolymers comprising monomer units selected from conjugated diene monomers and monomers selected from the group consisting of monovinyl aromatic monomers and triene monomers.

11. The composition of claim 10, wherein the elastomer is selected from the group consisting of polyisoprene, polystyrene, polybutadiene, butadiene-isoprene copolymer, butadiene-isoprene-styrene terpolymer, isoprene-styrene copolymer, styrene-butadiene copolymer, 1,4-polybutadiene, vinyl polybutadiene, and mixtures thereof.

12. The composition of claim 1, wherein the elastomer contains a functional group derived from a polymerization terminating agent.

13. The composition of claim 12, wherein the terminating agent has the formula $(R_1)_a ZX_b$, wherein Z is tin or silicon, $R_1$ is selected from the group consisting of an alkyl having from about 1 to about 20 carbon atoms; a cycloalkyl having from about 3 to about 20 carbon atoms; an aryl having from about 6 to about 20 carbon atoms; and an aralkyl having from about 7 to about 20 atoms; X is a halogen or an alkoxy group; "a" is from 0 to 3, and "b" is from 1 to 4, and a+b =4.

14. The composition of claim 1, wherein the sulfur is selected from the group consisting of soluble sulfur, polymeric polysulfide, insoluble polymeric sulfur, and mixtures thereof.

15. The composition of claim 1, wherein the composition further comprises an additional processing aid selected from the group consisting of esters of fatty acid of hydrogenated $C_5$ or $C_6$ sugars, fatty acid esters of non-hydrogenated $C_5$ or $C_6$ sugars, polyoxyethylene derivatives of said hydrogenated and non-hydrogenated $C_5$ or $C_6$ sugars, esters of polyols, and mixtures thereof.

16. The composition of claim 15, wherein the additional processing aid is present in an amount of about 0.1% to about 60% by weight based on the weight of the silica.

17. The composition of claim 15, wherein the additional processing aid is fully or partially supported on the reinforcing filler.

18. The composition of claim 1, wherein the composition further comprises an additional filler selected from the group consisting of clay, talc, aluminum hydrate, mica, urea and sodium sulfate.

19. The composition of claim 18, wherein the additional filler is present in the amount of about 0.5 to about 40 parts by weight per hundred parts of the elastomer.

20. The composition of claim 18, wherein the monofunctional alkyl tin compound is supported fully or partially on the additional filler.

21. A pneumatic tire comprising a component produced from a vulcanized elastomeric composition that comprises an elastomer, a reinforcing filler comprising silica or a mixture thereof with carbon black, a monofunctional alkyl tin compound, a cure agent, and sulfur.

22. The tire of claim 21, wherein the elastomer is selected from the group consisting of homopolymers of conjugated diene monomers, and copolymers and terpolymers of the conjugated diene monomers with monovinyl aromatic monomers and trienes.

23. The tire of claim 21, wherein the elastomer is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

24. The tire of claim 21, wherein the monofunctional alkyl tin compound is selected from one or more of the group of alkyl tin compounds having the formula

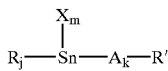

wherein R is independently selected from the group consisting of primary, secondary and tertiary alkyl groups having 1 to about 30 carbon atoms, alkaryl groups having about 6 to about 30 carbon atoms, and cycloaliphatic groups having about 5 to about 30 carbon atoms; A is independently selected from an oxy group and a carboxylate group; X is a halogen; R' is independently selected from hydrogen, $C_1$ to about $C_{20}$ saturated or unsaturated aliphatics, about $C_5$ to about $C_{20}$ cycloaliphatic, and about $C_6$ to about $C_{20}$ aromatic; "j" is an integer equal to 1 to 3; "m" is an integer equal to zero to 3;

and "k" is an integer equal to zero to 3; and (j+k+m) equals 4; wherein when "k" is 2 or greater, R' optionally forms a bridge between two A groups.

25. A process for the preparation of a vulcanizable elastomeric composition comprising the steps of:

a) mixing an elastomer with a reinforcing filler comprising silica or a mixture thereof with carbon black, a processing aid comprising a monofunctional alkyl tin compound, a cure agent, and an effective amount of sulfur to achieve a satisfactory cure of the composition; and b) effecting vulcanization.

26. The process of claim 25, wherein the monofunctional alkyl tin compound is selected from one or more of the group of alkyl tin compounds having the formula

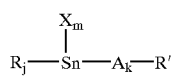

wherein R is independently selected from the group consisting of primary, secondary and tertiary alkyl groups having 1 to about 30 carbon atoms, alkaryl groups having about 6 to about 30 carbon atoms, and cycloaliphatic groups having about 5 to about 30 carbon atoms; A is independently selected from an oxy group and a carboxylate group; X is a halogen; R' is independently selected from hydrogen, $C_1$ to about $C_{20}$ saturated or unsaturated aliphatics, about $C_5$ to about $C_{20}$ cycloaliphatic, and about $C_6$ to about $C_{20}$ aromatic; "j" is an integer equal to 1 to 3; "m" is an integer equal to zero to 3; and "k" is an integer equal to zero to 3; and (j+k+m) equals 4; wherein when "k" is 2 or greater, R' optionally forms a bridge between two A groups.

* * * * *